US012600412B2

(12) United States Patent
Du et al.

(10) Patent No.: US 12,600,412 B2
(45) Date of Patent: Apr. 14, 2026

(54) VEHICLE BODY FRONT STRUCTURE AND VEHICLE

(71) Applicant: CHERY AUTOMOBILE CO., LTD., Wuhu (CN)

(72) Inventors: Shiwei Du, Wuhu (CN); Cheng Li, Wuhu (CN); Xinping Chang, Wuhu (CN); Tangfu Yuan, Wuhu (CN)

(73) Assignee: CHERY AUTOMOBILE CO., LTD., Wuhu (CN)

( * ) Notice: Subject to any disclaimer, the term of this patent is extended or adjusted under 35 U.S.C. 154(b) by 412 days.

(21) Appl. No.: 18/250,960

(22) PCT Filed: Nov. 26, 2021

(86) PCT No.: PCT/CN2021/133698
§ 371 (c)(1),
(2) Date: Apr. 27, 2023

(87) PCT Pub. No.: WO2022/111655
PCT Pub. Date: Jun. 2, 2022

(65) Prior Publication Data
US 2024/0001994 A1 Jan. 4, 2024

(30) Foreign Application Priority Data
Nov. 27, 2020 (CN) .......................... 202011357273.3

(51) Int. Cl.
B62D 21/15 (2006.01)
B62D 27/02 (2006.01)
(52) U.S. Cl.
CPC ......... B62D 21/155 (2013.01); B62D 27/023 (2013.01)

(58) Field of Classification Search
CPC .... B62D 21/155; B62D 27/02; B62D 21/152; B62D 25/082; B62D 25/085; B60R 19/24; B60R 2019/247
(Continued)

(56) References Cited

U.S. PATENT DOCUMENTS 9,242,676 B2 * 1/2016 Park ..................... B62D 25/082
9,969,432 B2 * 5/2018 Matsushima ........ B62D 25/082
(Continued)

FOREIGN PATENT DOCUMENTS

CN        204750298 U        11/2015
CN        204871191 U        12/2015
(Continued)

OTHER PUBLICATIONS

International Search Report of the International Searching Authority for State Intellectual Property Office of the People's Republic of China in PCT application No. PCT/CN2021/133698 issued on Mar. 4, 2022, which is an International application to which this application claims priority.
(Continued)

*Primary Examiner* — Roger L Pang
(74) *Attorney, Agent, or Firm* — Kolitch Romano Dascenzo Gates LLP

(57) ABSTRACT

Provided is a vehicle body front structure. The vehicle body front structure includes: a front longitudinal beam assembly, including a front longitudinal beam inner plate, a front longitudinal beam cover plate, and a front longitudinal beam support member, the front longitudinal beam inner plate including a longitudinal beam bottom plate and two longitudinal beam side plates, wherein the front longitudinal beam cover plate is opposite to the longitudinal beam bottom plate, a first portion of the front longitudinal beam support member is in a groove enclosed by the longitudinal (Continued)

beam bottom plate and the longitudinal beam side plates, a second portion of the front longitudinal beam support member is outside the groove; and a front wheel cover side reinforcement beam connected to the second portion.

16 Claims, 6 Drawing Sheets

(58) Field of Classification Search
USPC ............................... 296/187.09, 198, 203.02
See application file for complete search history.

(56) References Cited

U.S. PATENT DOCUMENTS

| | | | | |
|---|---|---|---|---|
| 10,807,644 | B2 * | 10/2020 | Kondo | ................... B62D 21/02 |
| 2014/0167450 | A1 * | 6/2014 | Sotoyama | ............ B62D 21/152 |
| | | | | 296/187.09 |
| 2015/0344073 | A1 | 12/2015 | Midoun et al. | |
| 2016/0107695 | A1 | 4/2016 | Lee et al. | |
| 2017/0021867 | A1 | 1/2017 | Lee et al. | |
| 2018/0370572 | A1 * | 12/2018 | Sekiya | ................. B62D 21/155 |

FOREIGN PATENT DOCUMENTS

| | | | |
|---|---|---|---|
| CN | 109533029 | A | 3/2019 |
| CN | 110758568 | A | 2/2020 |
| CN | 211617879 | U | 10/2020 |
| CN | 112429088 | A | 3/2021 |
| DE | 102015121076 | A1 | 1/2017 |

OTHER PUBLICATIONS

The State Intellectual Property Office of People's Republic of China, First Office Action in Patent Application No. CN202011357273.3 issued on Jul. 27, 2021, which is a foreign counterpart application corresponding to this U.S. Patent Application, to which this application claims priority.

European Patent Office, Extended European Search Report pursuant to Rule 62 EPC, dated Apr. 12, 2024 in European Application No. 21897155.4, which is a foreign counterpart to this U.S. Application.

\* cited by examiner

1

VEHICLE BODY FRONT STRUCTURE AND VEHICLE

CROSS-REFERENCE TO RELATED APPLICATIONS

The present application is a U.S. national phase application based on PCT/CN2021/133698, filed on Nov. 26, 2021, which claims priority to Chinese Patent Application No. 202011357273.3, filed on Nov. 27, 2020 and entitled "VEHICLE BODY FRONT STRUCTURE AND VEHICLE", which are incorporated herein by reference in their entireties.

TECHNICAL FIELD

The present disclosure relates to the technical field of vehicles, and in particular, to a vehicle body front structure and a vehicle.

BACKGROUND OF THE INVENTION

25% small overlap crashes attract increasing attention. During this type of crash, the frontal overlap between an obstacle and a vehicle body is small. Only 25% coverage is involved, and only a front wheel cover region outside a front longitudinal beam is covered. Consequently, the front longitudinal beam is not participated in the crash, and the front longitudinal beam cannot absorb energy during the crash, which results in poor impact resistance of the vehicle body.

SUMMARY OF THE INVENTION

The embodiments of the present disclosure provide a vehicle body front structure and a vehicle.

According to some embodiments of the present disclosure, a vehicle body front structure is provided, including: a front longitudinal beam assembly, including a front longitudinal beam inner plate, a front longitudinal beam cover plate, and a front longitudinal beam support member, the front longitudinal beam inner plate including a longitudinal beam bottom plate and two longitudinal beam side plates, wherein the two longitudinal beam side plates are respectively connected to two opposite side edges of the longitudinal beam bottom plate, and are connected to the front longitudinal beam cover plate, the front longitudinal beam cover plate is opposite to the longitudinal beam bottom plate, a first portion of the front longitudinal beam support member is in a groove enclosed by the longitudinal beam bottom plate and the longitudinal beam side plates, a second portion of the front longitudinal beam support member is outside the groove, the first portion is connected to the longitudinal beam bottom plate and the longitudinal beam side plates, and a surface of the front longitudinal beam support member is connected to a side edge of the front longitudinal beam cover plate; and a front wheel cover side reinforcement beam connected to the second portion.

In some embodiments, a length of the front longitudinal beam cover plate is less than a length of the longitudinal beam side plate in a length direction of the longitudinal beam side plate, and the first portion is on and connected to the side edge of the front longitudinal beam cover plate and is connected to the side edge of the front longitudinal beam cover plate.

In some embodiments, the front longitudinal beam support member includes a support bottom plate and two support side plates, wherein the two support side plates are respectively connected to two opposite side edges of the support bottom plate, a side edge of the support bottom plate is connected to a surface of the longitudinal beam bottom plate, a surface of the support bottom plate is connected to the side edge of the front longitudinal beam cover plate, the support side plates are parallel to the longitudinal beam side plates and are attached to the longitudinal beam side plates.

In some embodiments, the support bottom plate has two opposite first side edges and two opposite second side edges, two ends of each of the first side edges are respectively connected to the two second side edges, and the two support side plates are respectively connected to the two first side edges; and a first connection flange is arranged on the two second side edges, a portion of the first connection flange in the groove is attached to the longitudinal beam bottom plate, and a portion of the first connection flange outside the groove is attached to the front wheel cover side reinforcement beam.

In some embodiments, a second connection flange is arranged on the support side plate, wherein the second connection flange and the support bottom plate are on opposite sides of the support side plate, and the second connection flange is opposite to a side edge of the longitudinal beam side plate and is connected to the side edge of the longitudinal beam side plate.

In some embodiments, the vehicle body front structure further includes a support structure connected to the front longitudinal beam cover plate and the front longitudinal beam support member.

In some embodiments, the support structure includes a support connection plate having two opposite third side edges and two opposite fourth side edges, wherein two ends of each of the third side edges are respectively connected to the two fourth side edges, and the two third side edges are respectively connected to the surface of the front longitudinal beam support member and a surface of the front longitudinal beam cover plate.

In some embodiments, the support structure further includes two connection side plates respectively connected to the two fourth side edges, wherein the connection side plates are connected to the surface of the front longitudinal beam support member and the surface of the front longitudinal beam cover plate.

In some embodiments, a third connection flange is arranged on the longitudinal beam side plate, wherein the third connection flange and the longitudinal beam bottom plate are on opposite sides of the longitudinal beam side plate, and the third connection flange is attached to the front longitudinal beam cover plate.

In some embodiments, a fourth connection flange is arranged on the side edge of the front longitudinal beam cover plate, wherein the fourth connection flange is opposite to the front longitudinal beam support member, and the fourth connection flange is attached to the front longitudinal beam support member.

In some embodiments, the vehicle body front structure further includes a front baffle plate, wherein a first end of the front longitudinal beam inner plate is connected to the front baffle plate and is distal from the front longitudinal beam support member, a first end of the front longitudinal beam cover plate is connected to the front baffle plate and is distal from the front longitudinal beam support member, and a first end of the front wheel cover side reinforcement beam is connected to the front baffle plate and is distal from the front longitudinal beam support member.

In some embodiments, the vehicle body front structure includes two front longitudinal beam assemblies and two front wheel cover side reinforcement beams, wherein the two front longitudinal beam assemblies and the two front wheel cover side reinforcement beams are symmetrically on two sides of the front baffle plate.

In some embodiments, the front longitudinal beam support member is fastened to the front longitudinal beam cover plate by welding, and the front longitudinal beam inner plate is fastened to the front longitudinal beam cover plate by welding.

According to some embodiments of the present disclosure, a vehicle is provided. The vehicle includes the foregoing vehicle body front structure.

In some embodiments, the length of the front longitudinal beam cover plate is less than the length of the longitudinal beam side plate in the length direction of the longitudinal beam side plate, the first portion is on the side edge of the front longitudinal beam cover plate and is connected to the side edge of the front longitudinal beam cover plate.

In some embodiments, the front longitudinal beam support member includes the support bottom plate and the two support side plates, wherein the two support side plates are respectively connected to the two opposite side edges of the support bottom plate, the side edge of the support bottom plate is connected to the surface of the longitudinal beam bottom plate, the surface of the support bottom plate is connected to the side edge of the front longitudinal beam cover plate, the support side plates are parallel to the longitudinal beam side plates, and the support side plates are attached to the longitudinal beam side plates.

In some embodiments, the vehicle body front structure further includes the support structure connected to the front longitudinal beam cover plate and the front longitudinal beam support member.

BRIEF DESCRIPTION OF DRAWINGS

In order to describe the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art may still derive other drawings from these accompanying drawings without creative efforts.

Specific embodiments of the present disclosure are shown by the accompanying drawings and are described below in more detail. The accompanying drawings and text description are not intended to limit the scope of the concept of the present disclosure in any manner, but to explain the concept of the present disclosure for those skilled in the art with reference to specific embodiments.

DETAILED DESCRIPTION

In order to make the objectives, technical solutions, and advantages of the present disclosure clearer, the embodiments of the present disclosure will be further described in detail below with reference to the accompanying drawings.

In the related art, a solution to a 25% small overlap crash is mainly to add a connector on a side wall of a front longitudinal beam, and a front wheel cover side reinforcement beam is connected to the connector, to transfer an impact force applied to the front wheel cover side reinforcement beam to the front longitudinal beam through the connector.

However, in response to a 25% small overlap crash by a vehicle body structure in the related art, because the connector is connected to an outer side wall of the front longitudinal beam, the outer side wall of the front longitudinal beam to which the connector is connected bears a large local force when subjected to impact of the crash. Consequently, the front longitudinal beam is easy to be pulled, causing the front longitudinal beam to bend, and a force applied to the front longitudinal beam fails to be transferred.

Figure 1:
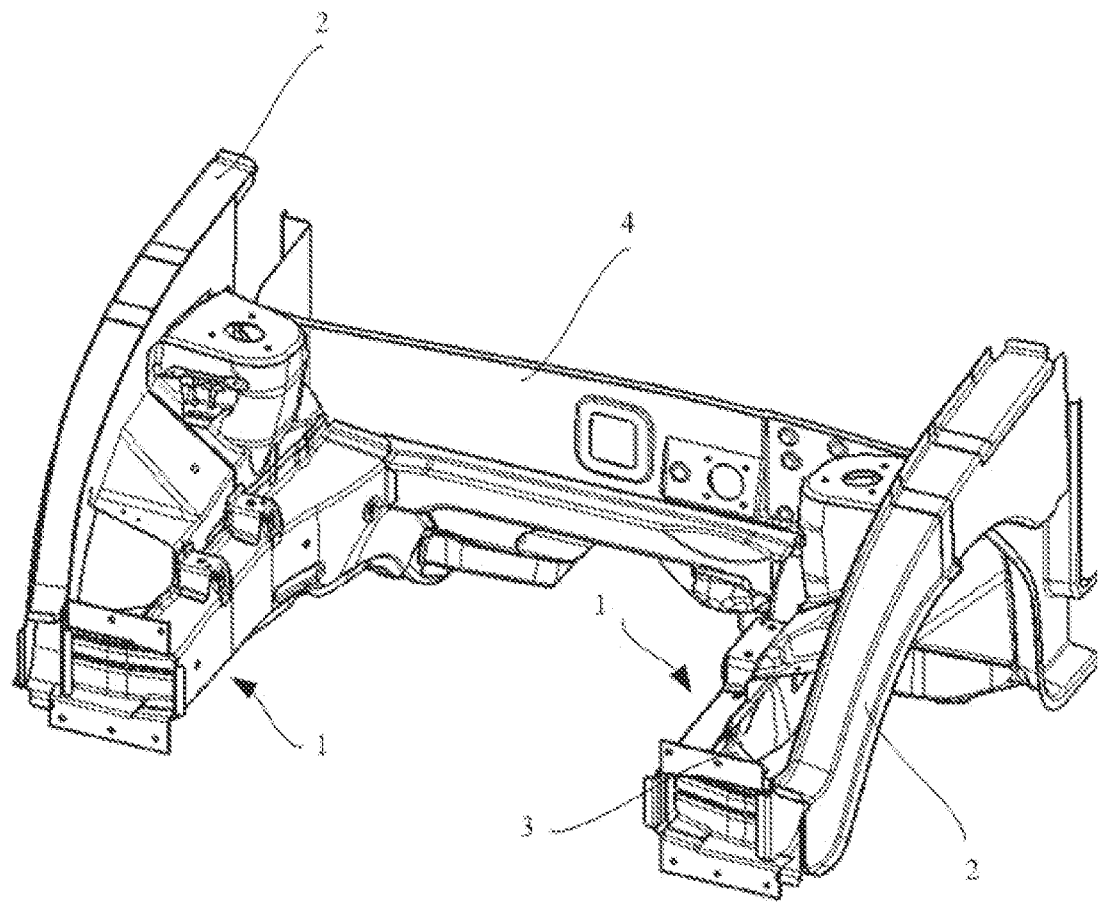
FIG. 1 is a schematic diagram of a vehicle body front structure according to some embodiments of the present disclosure.
Figure 2:
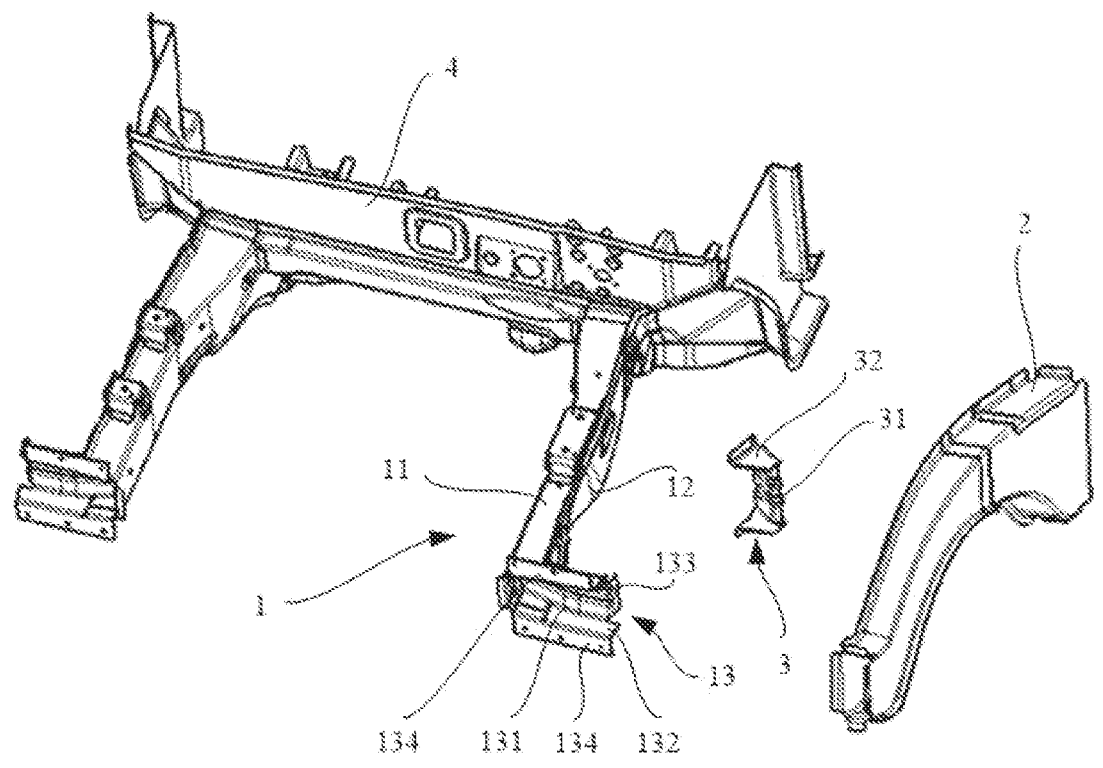
FIG. 2 is a partially exploded view of a vehicle body front structure according to some embodiments of the present disclosure.

FIG. 1 is a schematic diagram of a vehicle body front structure according to some embodiments of the present disclosure. FIG. 2 is a partially exploded view of a vehicle body front structure according to some embodiments of the present disclosure. As shown in FIG. 1, the vehicle body front structure includes a front longitudinal beam assembly 1 and a front wheel cover side reinforcement beam 2. The front longitudinal beam assembly 1 is connected to the front wheel cover side reinforcement beam 2.

Referring to FIG. 1 and FIG. 2, the vehicle body front structure further includes a front baffle plate 4. A portion of a front longitudinal beam inner plate 11 opposite to a front longitudinal beam support member 13 is connected to the front baffle plate 4. A portion of a front longitudinal beam cover plate 12 opposite to the front longitudinal beam support member 13 is connected to the front baffle plate 4. A portion of the front wheel cover side reinforcement beam 2 opposite to the front longitudinal beam support member 13 is connected to the front baffle plate 4.

As shown in FIG. 2, the front longitudinal beam assembly 1 includes the front longitudinal beam inner plate 11, the front longitudinal beam cover plate 12, and the front longitudinal beam support member 13.

The front longitudinal beam inner plate 11 and the front longitudinal beam cover plate 12 are connected to the front longitudinal beam support member 13. The front longitudinal beam support member 13 is also connected to the front wheel cover side reinforcement beam 2.

Figure 3:
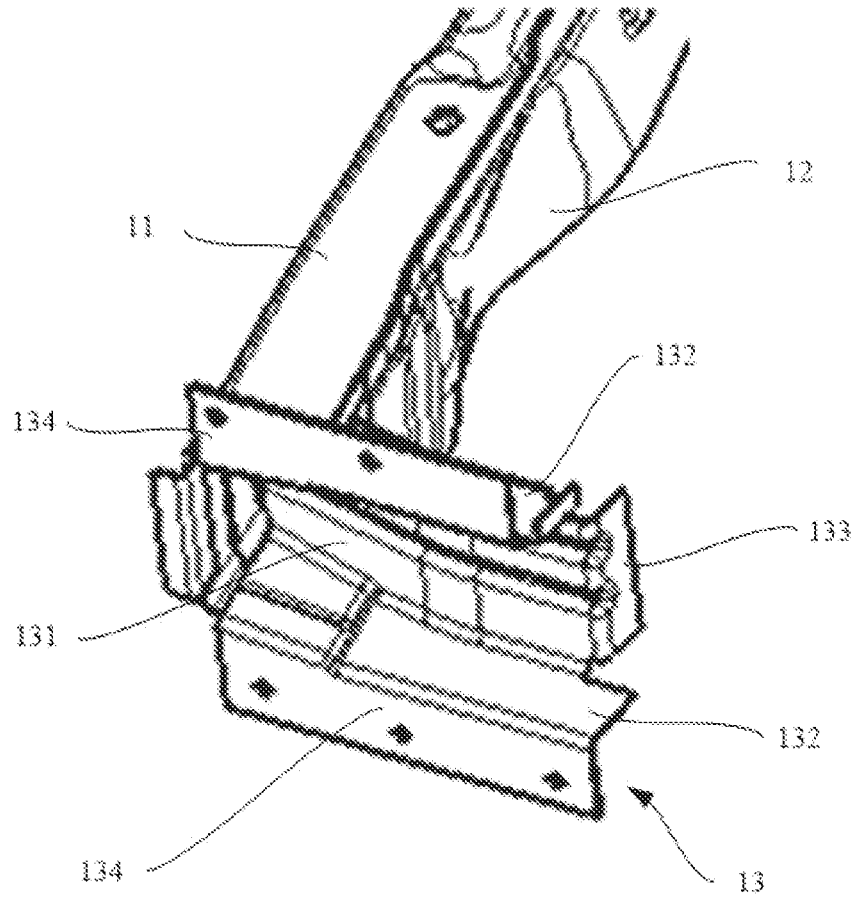
FIG. 3 is a schematic diagram of a partial structure of a front longitudinal beam assembly according to some embodiments of the present disclosure.
Figure 4:
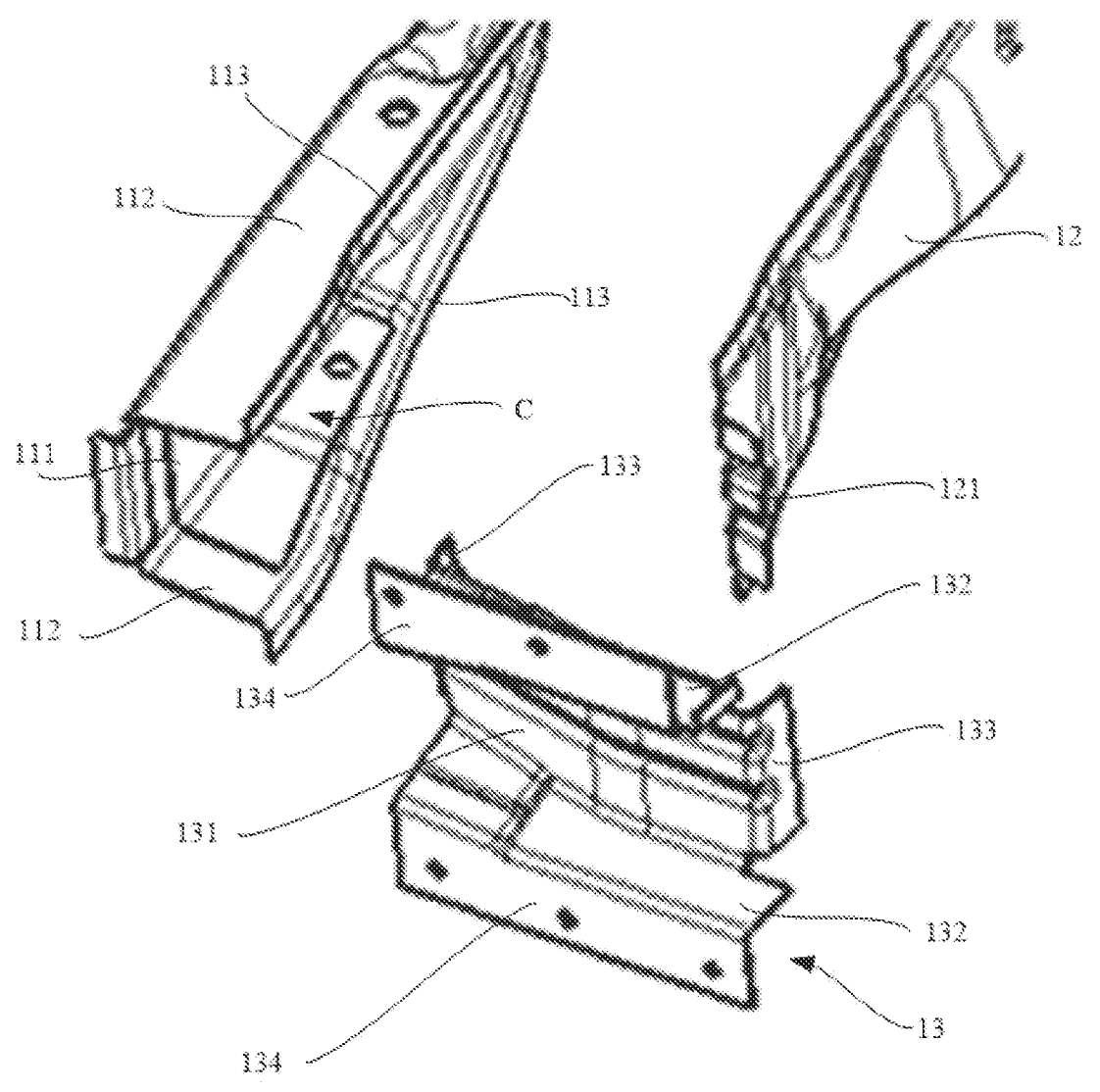
FIG. 4 is an exploded view of a front longitudinal beam assembly according to some embodiments of the present disclosure.

FIG. 3 is a schematic diagram of a partial structure of the front longitudinal beam assembly 1 according to some embodiments of the present disclosure. FIG. 3 shows a portion of the front longitudinal beam inner plate 11, a portion of the front longitudinal beam cover plate 12, and the front longitudinal beam support member 13 included in the front longitudinal beam assembly. FIG. 4 is an exploded view of the front longitudinal beam assembly 1 according to some embodiments of the present disclosure. As shown in FIG. 3 and FIG. 4, the front longitudinal beam inner plate 11 includes a longitudinal beam bottom plate 111 and two longitudinal beam side plates 112 connected to opposite sides of the longitudinal beam bottom plate 111. The two longitudinal beam side plates 112 are connected to the front longitudinal beam cover plate 12. The front longitudinal beam cover plate 12 is opposite to the longitudinal beam bottom plate 111.

As shown in FIG. 3 and FIG. 4, a portion of the front longitudinal beam support member 13 is in a groove C enclosed by the longitudinal beam bottom plate 111 and the longitudinal beam side plates 112. The portion of the front longitudinal beam support member 13 in the groove C is connected to the longitudinal beam bottom plate 111 and the longitudinal beam side plates 112. A surface of the front longitudinal beam support member 13 is connected to a side edge of the front longitudinal beam cover plate 12. That is, a first portion of the front longitudinal beam support member 13 is in the groove C enclosed by the longitudinal beam bottom plate 111 and the longitudinal beam side plates 112, and a second portion of the front longitudinal beam support member 13 is outside the groove C. The first portion is connected to the longitudinal beam bottom plate 111 and the longitudinal beam side plates 112. The surface of the front longitudinal beam support member 13 is connected to the side edge of the front longitudinal beam cover plate 12.

Figure 5:
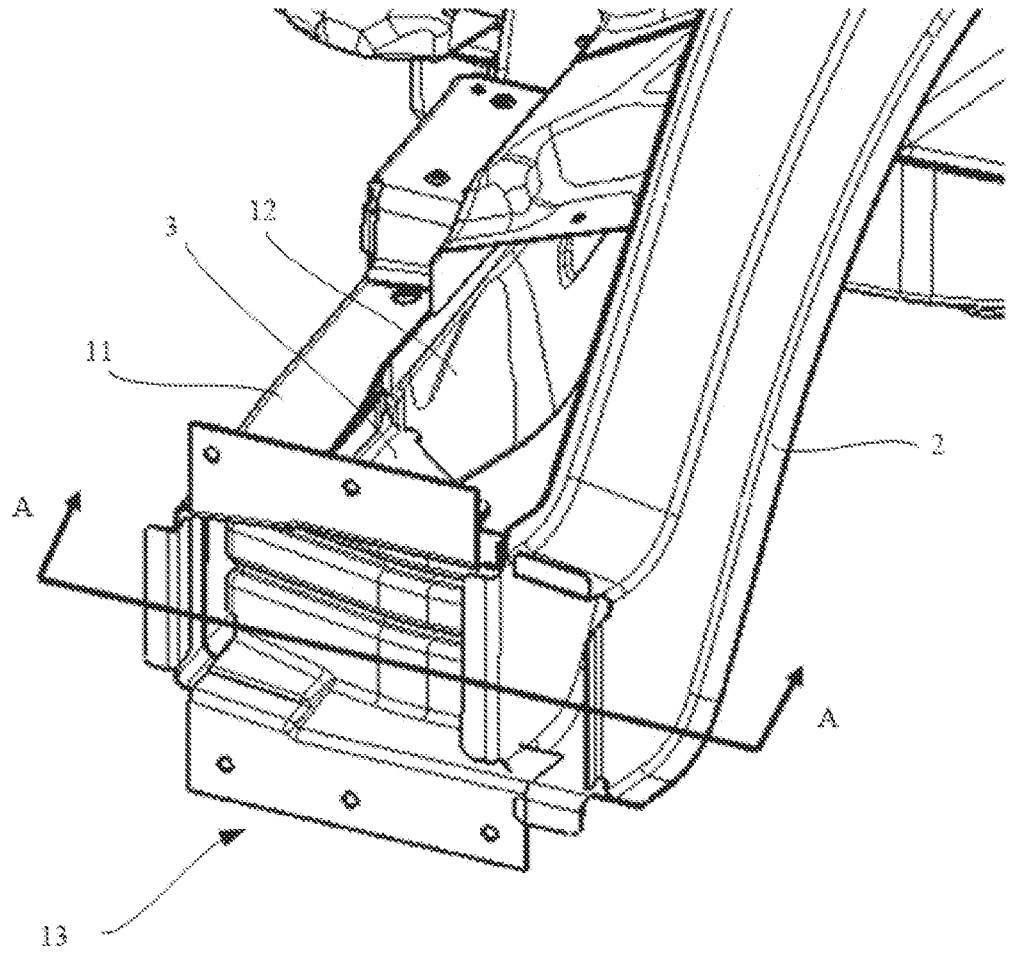
FIG. 5 is a schematic assembly diagram of a vehicle body front structure according to some embodiments of the present disclosure.

FIG. 5 is a schematic assembly diagram of a vehicle body front structure according to some embodiments of the present disclosure. As shown in FIG. 5, the front wheel cover side reinforcement beam 2 is connected to the portion of the front longitudinal beam support member 13 outside the groove C. That is, the front wheel cover side reinforcement beam 2 is connected to the second portion.

The vehicle body front structure provided in the embodiments of the present disclosure includes the front longitudinal beam assembly 1 and the front wheel cover side reinforcement beam 2. The front longitudinal beam assembly 1 includes the front longitudinal beam inner plate 11, the front longitudinal beam cover plate 12, and the front longitudinal beam support member 13. The longitudinal beam bottom plate 111 and the longitudinal beam side plates 112 of the front longitudinal beam inner plate 11 make the front longitudinal beam inner plate 11 U-shaped. That is, the longitudinal beam bottom plate 111 and the longitudinal beam side plates 112 form the U-shaped groove C. In addition, the front longitudinal beam cover plate 12 covers an opening of the groove C of the front longitudinal beam inner plate 11 to form a stable structure with a square cross section.

The portion of the front longitudinal beam support member 13 is in the groove C between the front longitudinal beam inner plate 11 and the front longitudinal beam cover plate 12. The portion of the front longitudinal beam support member 13 in the groove C is connected to the longitudinal beam bottom plate 111 and the longitudinal beam side plates 112. The front wheel cover side reinforcement beam 2 is connected to the portion of the front longitudinal beam support member 13 outside the groove C. In this way, in the case that the front wheel cover side reinforcement beam 2 is subjected to a small overlap crash, the front wheel cover side reinforcement beam 2 transfers energy to the front longitudinal beam inner plate 11 through the front longitudinal beam support member 13 after being subjected to a force. A force-bearing point of the front longitudinal beam inner plate 11 is at the longitudinal beam bottom plate 111 and the longitudinal beam side plates 112, that is, the force-bearing position is inside the front longitudinal beam assembly 1. In comparison with the related art in which a connection plate is directly connected to an outer side wall of a front longitudinal beam, in the embodiments of the present disclosure, in the case that the front longitudinal beam assembly 1 bears a force, side walls of the front longitudinal beam assembly 1 share an external force, avoiding the situation that the outer side wall of the front longitudinal beam is subjected to an excessive local force. In addition, the front longitudinal beam assembly 1 is a stable structure with a square cross section, such that the front longitudinal beam is not easy to bend, and the front longitudinal beam assembly 1 can effectively transfer energy.

Optionally, a surface of the front longitudinal beam cover plate 12 is provided with an opening. The opening is on a side edge of the front longitudinal beam cover plate 12 close to the front longitudinal beam support member 13. The opening penetrates the surface of the front longitudinal beam cover plate 12. The opening communicates with the groove C.

The front longitudinal beam support member 13 is in the opening and connected to a side edge of the opening. A portion of the front longitudinal beam support member 13 passes through the opening and is connected to the longitudinal beam bottom plate 111 and the longitudinal beam side plates 112. The other portion of the front longitudinal beam support member 13 is connected to the side edge of the front longitudinal beam cover plate 12.

The surface of the front longitudinal beam cover plate 12 is provided with the opening as a through structure for the front longitudinal beam support member 13, such that the front longitudinal beam support member 13 passes through the opening and enter the groove C. In this way, the front longitudinal beam support member 13 is connected to the longitudinal beam bottom plate 111 and the longitudinal beam side plates 112. In the case that a force is borne during a crash, each side wall of the front longitudinal beam assembly 1 bears portion of the external force through the front longitudinal beam support member 13, avoiding the situation that the outer side wall of the front longitudinal beam bears an excessive local force. Therefore, the front longitudinal beam assembly 1 can effectively transfer energy.

For example, as shown in FIG. 2 and FIG. 4, the opening is a groove extending from the side edge of the front longitudinal beam cover plate 12 in a length direction of the longitudinal beam bottom plate 111.

The opening is provided on the side edge of the front longitudinal beam cover plate 12 to facilitate grooving to form the opening. In this way, in the case that the front longitudinal beam support member 13 is in the groove, the front longitudinal beam support member 13 seals ends of the longitudinal beam bottom plate 111 and the longitudinal beam side plates 112 to seal the groove C, such that the front longitudinal beam assembly 1 has a more stable closed structure.

It should be noted that a size of the opening in a width direction of the front longitudinal beam cover plate 12 is the same as a width of the front longitudinal beam cover plate 12. That is, a length of the front longitudinal beam cover plate 12 is less than a length of the longitudinal beam side plate 112.

Optionally, as shown in FIG. 3 and FIG. 4, the length of the front longitudinal beam cover plate 12 is less than the length of the longitudinal beam side plate 112 in a length direction of the longitudinal beam side plate 112. The first portion is on the side edge of the front longitudinal beam cover plate 12 and is connected to the side edge of the front longitudinal beam cover plate 12.

The length of the front longitudinal beam cover plate 12 is set to be less than the length of the longitudinal beam side plate 112, such that the side, close to the front longitudinal beam support member 13, of the front longitudinal beam cover plate 12 has a notch exposing the groove C. In this way, the front longitudinal beam support member 13 is in the groove C through the notch and exactly seal the ends of the longitudinal beam bottom plate 111 and the longitudinal beam side plates 112 to seal the groove C, such that the front longitudinal beam assembly 1 has a more stable closed structure.

As shown in FIG. 3 and FIG. 4, the front longitudinal beam support member 13 includes a support bottom plate 131 and two support side plates 132 disposed on two opposite sides of the support bottom plate 131. That is, the two support side plates 132 are respectively connected to two opposite side edges of the support bottom plate 131. A side edge of the support bottom plate 131 is connected to a surface of the longitudinal beam bottom plate 111. A surface of the support bottom plate 131 is connected to the side edge of the front longitudinal beam cover plate 12. The support side plates 132 are parallel to the longitudinal beam side plates 112. The two support side plates 132 are respectively attached to the two longitudinal beam side plates 112.

The two support side plates 132 parallel to each other are disposed on the support bottom plate 131, such that the two support side plates 132 are exactly attached to inner wall surfaces of the longitudinal beam side plates 112 in parallel to the inner wall surfaces of the longitudinal beam side plates 112, in the case that the side edge of the support bottom plate 131 is connected to the surface of the longitudinal beam bottom plate 111. That is, the connection between the front longitudinal beam support member 13 and the longitudinal beam side plate 112 is adjusted to be surface contact to improve reliability of the connection between the front longitudinal beam support member 13 and the front longitudinal beam inner plate 11 and prevent the front longitudinal beam support member 13 from being easily separated from the front longitudinal beam inner plate 11. In addition, in the case that the front wheel cover side reinforcement beam 2 is subjected to a force during a crash, an external force is more reliably transferred to the longitudinal beam side plate 112 through the front longitudinal beam support member 13 to disperse the external force, such that the front longitudinal beam assembly 1 can effectively transfer energy.

For example, as shown in FIG. 4, the support bottom plate 131 of the front longitudinal beam support member 13 is rectangular, and the two support side plates 132 are disposed on the two opposite side edges of the support bottom plate 131. In addition, the support side plates 132 are perpendicularly connected to the support bottom plate 131.

In the case that the front longitudinal beam support member 13 is assembled and connected to the front longitudinal beam inner plate 11 and the front longitudinal beam cover plate 12, the support side plates 132 of the front longitudinal beam support member 13 are controlled to be in the groove C of the front longitudinal beam inner plate 11 and the front longitudinal beam cover plate 12 in a state of being parallel to the longitudinal beam side plates 112, such that a side edge of the front longitudinal beam support member 13 is connected to the longitudinal beam bottom plate 111 of the front longitudinal beam inner plate 11. The two support side plates 132 are controlled to be attached to the longitudinal beam side plates 112 to connect the front longitudinal beam support member 13 to the front longitudinal beam inner plate 11. Then, the side edge of the front longitudinal beam cover plate 12 is connected to the surface of the support bottom plate 131 to form the front longitudinal beam assembly 1.

During a small overlap crash, the front longitudinal beam assembly 1 bears an external force transferred from the front longitudinal beam support member 13. The external force is dispersed to the longitudinal beam bottom plate 111 and the longitudinal beam side plates 112 through the front longitudinal beam support member 13, such that side walls are uniformly stressed. Therefore, the front longitudinal beam assembly 1 is not easy to bend, and can effectively transfer energy.

The front longitudinal beam inner plate 11 and the front longitudinal beam support member 13, the front longitudinal beam support member 13 and the front longitudinal beam cover plate 12, and the front longitudinal beam inner plate 11 and the front longitudinal beam cover plate 12 are fastened to each other by welding. The welding is, for example, spot welding or plug welding.

As shown in FIG. 4, the support bottom plate 131 has two opposite first side edges and two opposite second side edges. Two ends of each of the first side edges are respectively connected to the two second side edges. The two support side plates 132 are respectively connected to the two first side edges.

The two second side edges have a first connection flange 133. As shown in FIG. 3, a portion of the first connection flange 133 in the groove C is attached to the longitudinal beam bottom plate 111. As shown in FIG. 5, a portion of the first connection flange 133 outside the groove C is attached to the front wheel cover side reinforcement beam 2.

The first connection flange 133 is disposed on the side plate connecting the support bottom plate 131 and the longitudinal beam bottom plate 111, such that the first connection flange 133 of the support bottom plate 131 is exactly attached to an inner wall surface of the longitudinal beam bottom plate 111 in parallel, in the case that the support bottom plate 131 is connected to the surface of the longitudinal beam bottom plate 111. That is, the connection between the support bottom plate 131 and the longitudinal beam bottom plate 111 is adjusted to be surface contact to improve reliability of the connection between the front longitudinal beam support member 13 and the front longitudinal beam inner plate 11 and prevent the front longitudinal beam support member 13 from easily falling off from the front longitudinal beam inner plate 11. In addition, in the case that the front wheel cover side reinforcement beam 2 is subjected to a force during a crash, an external force is more reliably transferred to the longitudinal beam bottom plate 111 through the front longitudinal beam support member 13 to disperse the external force, such that the front longitudinal beam assembly 1 can effectively transfer energy.

For example, as shown in FIG. 4, the first connection flange 133 on the support bottom plate 131 is a perpendicular flange. The first connection flange 133 is disposed on a side surface of the support bottom plate 131 opposite to the support side plate 132. That is, the first connection flange 133 and the support side plate 132 are disposed on two opposite side surfaces.

During a small overlap crash, the front longitudinal beam support member 13 can more stably and reliably transfer power to the longitudinal beam bottom plate 111, such that the longitudinal beam bottom plate 111 shares an external force. Therefore, the front longitudinal beam assembly 1 is less likely to be bent, and the front longitudinal beam assembly 1 can effectively transfer energy.

Optionally, as shown in FIG. 3 and FIG. 4, a second connection flange 134 is disposed on a side edge of the support side plate 132 opposite to the support bottom plate 131. That is, the support side plate 132 has the second connection flange 134, and the second connection flange 134 and the support bottom plate 131 are disposed on opposite sides of the support side plate 132. The second connection flange 134 is opposite to and connected to the side edge of the longitudinal beam side plate 112.

The second connection flange 134 is disposed on the side edge of the support side plate 132, and the second connection flange 134 is connected to the side edge of the longitudinal beam side plate 112, such that reliability of the connection between the front longitudinal beam support member 13 and the front longitudinal beam inner plate 11 is improved.

In addition, two second connection flanges 134 extend in opposite directions, such that the second connection flanges 134 abut against the side edges of the longitudinal beam side plates 112, in the case that the front longitudinal beam support member 13 is connected to the front longitudinal beam inner plate 11. That is, in the case that the front longitudinal beam support member 13 and the front longitudinal beam inner plate 11 are assembled, the second connection flanges 134 abut against the side edges of the longitudinal beam side plates 112 to achieve installation and positioning of the front longitudinal beam support member 13.

The second connection flange 134 is further provided with a connection hole. The second connection flange 134 is installed on another portion of a vehicle body through the connection hole to facilitate connections and assembly.

Optionally, as shown in FIG. 4, a third connection flange 113 is disposed on a side edge of the longitudinal beam side plate 112 opposite to the longitudinal beam bottom plate 111. That is, the longitudinal beam side plate 112 has the third connection flange 113, and the third connection flange 113 and the longitudinal beam bottom plate 111 are disposed on opposite sides of the longitudinal beam side plate 112. The third connection flange 113 is attached to the front longitudinal beam cover plate 12.

The third connection flange 113 is disposed on the longitudinal beam side plate 112 to increase a contact region between the longitudinal beam side plate 112 and the front longitudinal beam cover plate 12, such that the longitudinal beam side plate 112 is connected to the front longitudinal beam cover plate 12 more reliably. The front longitudinal beam cover plate 12 is prevented from easily falling off from the front longitudinal beam inner plate 11, and a square structure formed by the front longitudinal beam cover plate 12 and the front longitudinal beam inner plate 11 is more stable.

Optionally, as shown in FIG. 4, a fourth connection flange 121 is disposed on a side edge of the front longitudinal beam cover plate 12 opposite to the front longitudinal beam support member 13. That is, the side edge of the front longitudinal beam cover plate 12 has the fourth connection flange 121, and the fourth connection flange 121 is opposite to the front longitudinal beam support member 13. The fourth connection flange 121 is attached to the front longitudinal beam support member 13.

The fourth connection flange 121 is disposed on the front longitudinal beam cover plate 12 to increase a contact region between the front longitudinal beam cover plate 12 and the front longitudinal beam support member 13, such that the front longitudinal beam cover plate 12 is connected to the front longitudinal beam support member 13 more reliably. The front longitudinal beam cover plate 12 is prevented from easily falling off from the front longitudinal beam support member 13.

Figure 6:
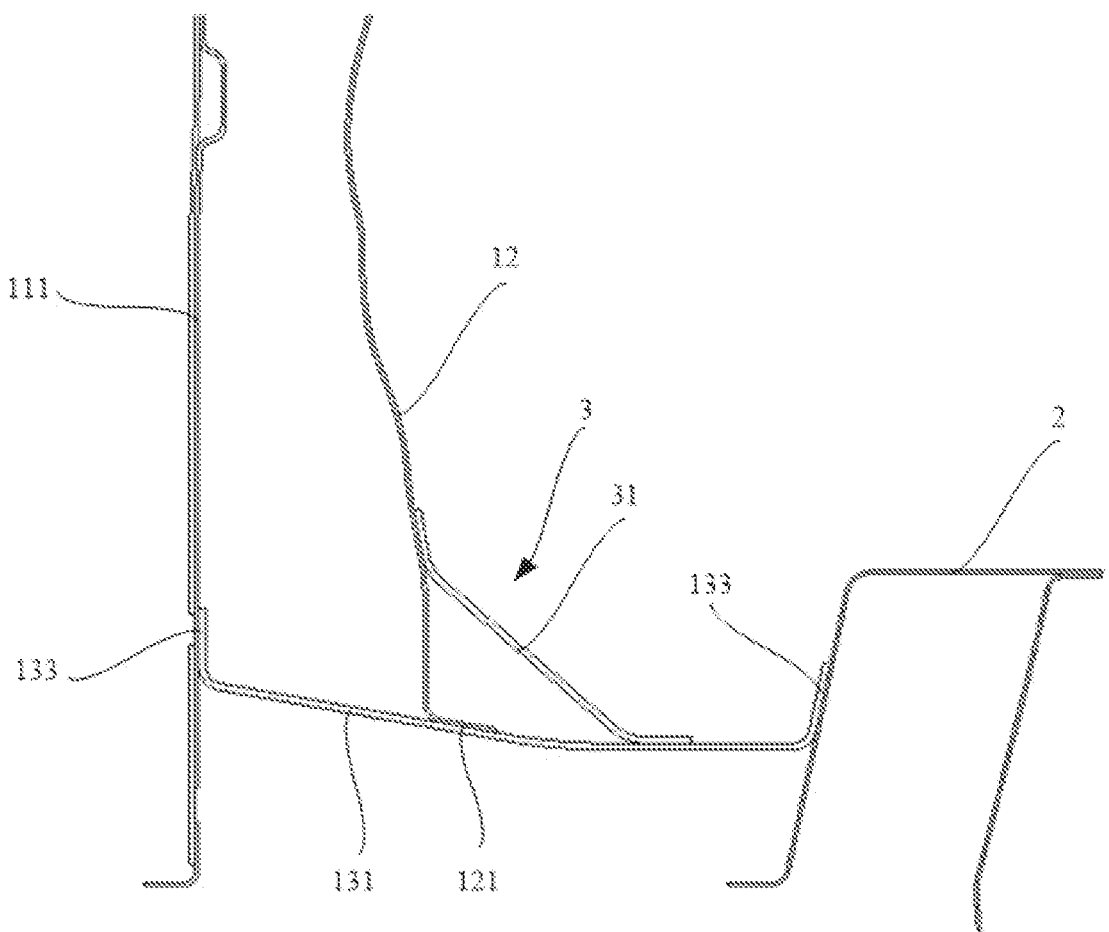
FIG. 6 is a cross-sectional view at A-A in FIG. 5.

FIG. 6 is a cross-sectional view at A-A in FIG. 5. As shown in FIG. 6, the vehicle body front structure further includes a support structure 3. The support structure 3 is connected to the front longitudinal beam cover plate 12 and the front longitudinal beam support member 13. The support structure 3 connected to the surface of the front longitudinal beam support member 13 and the surface of the front longitudinal beam cover plate 12 is disposed to jointly form a stable triangular structure to improve impact resistance of the front longitudinal beam assembly 1.

For example, as shown in FIG. 6, the support structure 3 includes a support connection plate 31. Two opposite side edges of the support connection plate 31 parallel to the front longitudinal beam support member 13 are respectively connected to the surface of the front longitudinal beam support member 13 and the surface of the front longitudinal beam cover plate 12. That is, the support connection plate 31 has two opposite third side edges and two opposite fourth side edges. Two ends of each of the third side edges are respectively connected to the two fourth side edges. The support connection plate 31 has the two opposite third side edges and the two opposite fourth side edges. The two ends of each of the third side edges are respectively connected to the two fourth side edges. The two third side edges are respectively connected to the surface of the front longitudinal beam support member 13 and the surface of the front longitudinal beam cover plate 12.

The support connection plate 31 connected to the surface of the front longitudinal beam support member 13 and the surface of the front longitudinal beam cover plate 12 is disposed, such that the support connection plate 31, the front longitudinal beam support member 13, and the front longitudinal beam cover plate 12 jointly form a stable triangular structure to improve the impact resistance of the front longitudinal beam assembly 1, avoiding the situation that the front longitudinal beam assembly 1 is easy to bend, improving an energy absorption effect of the vehicle body front structure, and reducing deformation of a passenger compartment, and improve safety.

For example, as shown in FIG. 2, the support structure 3 further includes two connection side plates 32. The two connection side plates 32 are disposed on two opposite side edges of the support connection plate 31 that intersect the front longitudinal beam support member 13. The connection side plates 32 are connected to the surface of the front longitudinal beam support member 13 and the surface of the front longitudinal beam cover plate 12. That is, the support structure 3 further include the two connection side plates 32, and the two connection side plates 32 are respectively connected to the two fourth side edges. The connection side plates 32 are connected to the surface of the front longitudinal beam support member 13 and the surface of the front longitudinal beam cover plate 12.

Because the support connection plate 31, the front longitudinal beam support member 13, and the front longitudinal beam cover plate 12 jointly form a stable triangular structure, the connection side plate 32 is also triangular, such that the connection side plate 32 is exactly clamped in a gap between the support connection plate 31, the front longitudinal beam support member 13, and the front longitudinal beam cover plate 12, in the case that the support connection plate 31 is connected to the front longitudinal beam support member 13 and the front longitudinal beam cover plate 12. That is, a side edge of the connection side plate 32 is connected to the front longitudinal beam cover plate 12, and another side edge of the connection side plate 32 is connected to the front longitudinal beam support member 13, such that the support connection plate 31 more reliably connects the front longitudinal beam support member 13 and the front longitudinal beam cover plate 12 to improve the impact resistance of the front longitudinal beam assembly 1, avoiding the situation that the front longitudinal beam assembly 1 is easy to bend, improving the energy absorption effect of the vehicle body front structure, and reducing the deformation of the passenger compartment, and improve the safety.

The portion of the front longitudinal beam inner plate 11 opposite to the front longitudinal beam support member 13 is a region of the front longitudinal beam inner plate 11 distal from the front longitudinal beam support member 13. The portion of the front longitudinal beam cover plate 12 opposite to the front longitudinal beam support member 13 is a region of the front longitudinal beam cover plate 12 distal from the front longitudinal beam support member 13. The portion of the front wheel cover side reinforcement beam 2 opposite to the front longitudinal beam support member 13 is a region of the front wheel cover side reinforcement beam 2 distal from the front longitudinal beam support member 13.

For example, in combination with specific components of the front longitudinal beam inner plate 11, a side edge of the longitudinal beam bottom plate 111 is connected to the front longitudinal beam support member 13. The side edge of the longitudinal beam bottom plate 111 away from the front longitudinal beam support member 13 is a portion of the longitudinal beam bottom plate 111 opposite to the front longitudinal beam support member 13.

Optionally, as shown in FIG. 1, the vehicle body front structure further includes a front baffle plate 4. A first end of the front longitudinal beam inner plate 11 is connected to the front baffle plate 4. The first end of the front longitudinal beam inner plate 11 is distal from the front longitudinal beam support member 13. A first end of the front longitudinal beam cover plate 12 is connected to the front baffle plate 4. The first end of the front longitudinal beam cover plate 12 is distal from the front longitudinal beam support member 13. A first end of the front wheel cover side reinforcement beam 2 is connected to the front baffle plate 4. The first end of the front wheel cover side reinforcement beam 2 is distal from the front longitudinal beam support member 13.

As shown in FIG. 1, in the vehicle body front structure, the front longitudinal beam assembly 1, the front wheel cover side reinforcement beam 2, and the support structure 3 are arranged on each of left and right sides of the front baffle plate 4. The front longitudinal beam assemblies 1, two front wheel cover side reinforcement beams 2, and two support structures 3 disposed on the two sides of the front baffle plate 4 are symmetrically arranged. The front baffle plate 4 is connected to the front longitudinal beam inner plate 11, the front longitudinal beam cover plate 12, and the front wheel cover side reinforcement beam 2. The front longitudinal beam assembly 1 and the front wheel cover side reinforcement beam 2 are reliably fastened to each other, such that a force transfer path during a crash is increased, and the front longitudinal beam assembly 1 and the front wheel cover side reinforcement beam 2 are deformed together. The front longitudinal beam inner plate 11, the front longitudinal beam cover plate 12, and the front wheel cover side reinforcement beam 2 bear a transferred external force. The external force is dispersed through a plurality of structures serving as an external force transfer path. The structures are deformed together, such that the energy absorption effect of the vehicle body front structure is improved, energy transferred to the front baffle plate 4 is reduced, deformation of the front baffle plate 4 is reduced, and the safety is improved.

The vehicle body front structure provided in the present disclosure is connected in the following manner:

First, the front longitudinal beam inner plate 11 and the front longitudinal beam support member 13 are connected by spot welding, which is specifically as follows. The longitudinal beam bottom plate 111 and the first connection flange 133 are fastened to each other by spot welding. The longitudinal beam side plate 112 and the support side plate 132 are fastened to each other by spot welding. The preceding components is connected to the front longitudinal beam cover plate 12 by plug and spot welding to form the front longitudinal beam assembly 1.

Then, the support connection plate 31 is disposed between the front longitudinal beam support member 13 and the front longitudinal beam cover plate 12. The two opposite side edges of the support connection plate 31 are fastened to the surface of the front longitudinal beam support member 13 and the surface of the front longitudinal beam cover plate 12 by spot welding and plug welding.

Finally, the front wheel cover side reinforcement beam 2 is attached to the first connection flange 133 of the front longitudinal beam support member 13 outside the groove C, and is fastened by spot welding and plug welding.

Embodiments of the present disclosure provide a vehicle, including the foregoing vehicle body front structure.

The vehicle body front structure includes the front longitudinal beam assembly 1, front wheel cover side reinforcement beam 2, and support structure 3. The front longitudinal beam assembly 1 includes the front longitudinal beam inner plate 11, front longitudinal beam cover plate 12, and front longitudinal beam support member 13. The front longitudinal beam inner plate 11 is U-shaped. The front longitudinal beam cover plate 12 covers the front longitudinal beam inner plate 11 to form a stable structure with a closed square cross section.

The portion of the front longitudinal beam support member 13 is in the groove C between the front longitudinal beam inner plate 11 and the front longitudinal beam cover plate 12. The portion of the front longitudinal beam support member 13 in the groove C is connected to the longitudinal beam bottom plate 111 and the longitudinal beam side plates 112. The front wheel cover side reinforcement beam 2 is connected to the portion of the front longitudinal beam support member 13 outside the groove C. In this way, in the case that the front wheel cover side reinforcement beam 2 is subjected to a small overlap crash test, the front wheel cover side reinforcement beam 2 transfers energy to the front longitudinal beam inner plate 11 through the front longitudinal beam support member 13 after being subjected to a force. The side walls of the front longitudinal beam assembly 1 share an external force. In addition, the front longitudinal beam assembly 1 is a stable structure with a square cross section, such that the front longitudinal beam assembly 1 is not easy to bend, and the front longitudinal beam assembly 1 can effectively transfer energy.

In addition, the support structure 3, the front longitudinal beam support member 13, and the front longitudinal beam cover plate 12 of the vehicle body front structure jointly form a stable triangular structure to improve the impact resistance of the front longitudinal beam assembly 1, avoiding the situation that the front longitudinal beam assembly 1 is easy to bend, improving the energy absorption effect of the vehicle body front structure, reducing the deformation of the passenger compartment, and improving safety of the vehicle.

The foregoing is not intended to limit the present disclosure in any form. Although the present disclosure has been disclosed by the foregoing embodiments, the embodiments are not intended to limit the present disclosure. Any person skilled in the art may make some changes or modifications to implement equivalent embodiments with equivalent changes by using the technical content disclosed above without departing from the scope of the technical solution of the present disclosure. Any simple modification, and equivalent change and modification made to the foregoing embodiments according to the technical essence of the present disclosure without departing from the content of the technical solution of the present disclosure shall fall within the scope of the technical solution of the present disclosure.

What is claimed is:

1. A vehicle body front structure, comprising:

a front longitudinal beam assembly, wherein the front longitudinal beam assembly comprises a front longitudinal beam inner plate, a front longitudinal beam cover plate, and a front longitudinal beam support member, wherein the front longitudinal beam inner plate comprises a longitudinal beam bottom plate and two longitudinal beam side plates, wherein the two longitudinal beam side plates are respectively connected to two opposite side edges of the longitudinal beam bottom plate and are connected to the front longitudinal beam cover plate, wherein the front longitudinal beam cover plate is opposite to the longitudinal beam bottom plate, wherein a first portion of the front longitudinal beam support member is in a groove enclosed by the longitudinal beam bottom plate and the longitudinal beam side plates, a second portion of the front longitudinal beam support member is outside the groove, the first portion is connected to the longitudinal beam bottom plate and the longitudinal beam side plates, and a surface of the front longitudinal beam support member is connected to a side edge of the front longitudinal beam cover plate; and a front wheel cover side reinforcement beam connected to the second portion, wherein the vehicle body front structure further comprises a support structure connected to the front longitudinal beam cover plate and the front longitudinal beam support member, the support structure comprises a support connection plate having two opposite third side edges and two opposite fourth side edges, wherein two ends of each of the third side edges are respectively connected to the two fourth side edges, and the two third side edges are respectively connected to the surface of the front longitudinal beam support member and a surface of the front longitudinal beam cover plate.

2. The vehicle body front structure according to claim 1, wherein a length of the front longitudinal beam cover plate is less than a length of one of the longitudinal beam side plates in a length direction of the one of the longitudinal beam side plates; and wherein the first portion is on the side edge of the front longitudinal beam cover plate and is connected to the side edge of the front longitudinal beam cover plate.

3. The vehicle body front structure according to claim 1, wherein the front longitudinal beam support member comprises a support bottom plate and two support side plates, wherein the two support side plates are respectively connected to two opposite side edges of the support bottom plate, a side edge of the support bottom plate is connected to a surface of the longitudinal beam bottom plate, a surface of the support bottom plate is connected to the side edge of the front longitudinal beam cover plate, the support side plates are parallel to the longitudinal beam side plates and are attached to the longitudinal beam side plates.

4. The vehicle body front structure according to claim 3, wherein the support bottom plate has two opposite first side edges and two opposite second side edges, wherein two ends of each of the first side edges are respectively connected to the two second side edges, and the two support side plates are respectively connected to the two first side edges; and wherein a first connection flange is arranged on the two second side edges, wherein a portion of the first connection flange in the groove is attached to the longitudinal beam bottom plate, and a portion of the first connection flange outside the groove is attached to the front wheel cover side reinforcement beam.

5. The vehicle body front structure according to claim 3, wherein a second connection flange is arranged on one of the support side plates, wherein the second connection flange and the support bottom plate are on opposite sides of the one of the support side plates, and the second connection flange is opposite to a side edge of the longitudinal beam side plate and is connected to the side edge of the longitudinal beam side plate.

6. The vehicle body front structure according to claim 1, wherein the support structure further comprises two connection side plates respectively connected to the two fourth side edges, wherein the connection side plates are connected to the surface of the front longitudinal beam support member and the surface of the front longitudinal beam cover plate.

7. The vehicle body front structure according to claim 1, wherein a third connection flange is arranged on one of the longitudinal beam side plates, wherein the third connection flange and the longitudinal beam bottom plate are on opposite sides of the one of the longitudinal beam side plates, and the third connection flange is attached to the front longitudinal beam cover plate.

8. The vehicle body front structure according to claim 1, wherein a fourth connection flange is arranged on a side edge of the front longitudinal beam cover plate, wherein the fourth connection flange is opposite to the front longitudinal beam support member and is attached to the front longitudinal beam support member.

9. The vehicle body front structure according to claim 1, further comprising: a front baffle plate, wherein a first end of the front longitudinal beam inner plate is connected to the front baffle plate and is distal from the front longitudinal beam support member, a first end of the front longitudinal beam cover plate is connected to the front baffle plate and is distal from the front longitudinal beam support member, and a first end of the front wheel cover side reinforcement beam is connected to the front baffle plate and is distal from the front longitudinal beam support member.

10. The vehicle body front structure according to claim 9, comprising two front longitudinal beam assemblies and two front wheel cover side reinforcement beams, wherein the two front longitudinal beam assemblies and the two front wheel cover side reinforcement beams are symmetrically on two sides of the front baffle plate.

11. The vehicle body front structure according to claim 1, wherein the front longitudinal beam support member is fastened to the front longitudinal beam cover plate by welding, and the front longitudinal beam inner plate is fastened to the front longitudinal beam cover plate by welding.

12. A vehicle, comprising a vehicle body front structure, wherein the vehicle body front structure comprises:

a front longitudinal beam assembly, comprising a front longitudinal beam inner plate, a front longitudinal beam cover plate, and a front longitudinal beam support member, the front longitudinal beam inner plate comprising a longitudinal beam bottom plate and two longitudinal beam side plates, wherein the two longitudinal beam side plates are respectively connected to two opposite side edges of the longitudinal beam bottom plate and are connected to the front longitudinal beam cover plate, the front longitudinal beam cover plate is opposite to the longitudinal beam bottom plate, a first portion of the front longitudinal beam support member is in a groove enclosed by the longitudinal beam bottom plate and the longitudinal beam side plates, a second portion of the front longitudinal beam support member is outside the groove, the first portion is connected to the longitudinal beam bottom plate and the longitudinal beam side plates, and a surface of the front longitudinal beam support member is connected to a side edge of the front longitudinal beam cover plate; and a front wheel cover side reinforcement beam connected to the second portion, wherein the vehicle body front structure further comprises a support structure connected to the front longitudinal beam cover plate and the front longitudinal beam support member, the support structure comprises a support connection plate having two opposite third side edges and two opposite fourth side edges, wherein two ends of each of the third side edges are respectively connected to the two fourth side edges, and the two third side edges are respectively connected to the surface of the front longitudinal beam support member and a surface of the front longitudinal beam cover plate.

13. The vehicle according to claim 12, wherein a length of the front longitudinal beam cover plate is less than a length of one of the longitudinal beam side plates in a length direction of the one of the longitudinal beam side plates; and wherein the first portion is on the side edge of the front longitudinal beam cover plate and is connected to the side edge of the front longitudinal beam cover plate.

14. The vehicle according to claim 12, wherein the front longitudinal beam support member comprises a support bottom plate and two support side plates, wherein the two support side plates are respectively connected to two opposite side edges of the support bottom plate, a side edge of the support bottom plate is connected to a surface of the longitudinal beam bottom plate, a surface of the support bottom plate is connected to the side edge of the front longitudinal beam cover plate, the support side plates are parallel to the longitudinal beam side plates and are attached to the longitudinal beam side plates.

15. The vehicle according to claim 14, wherein the support bottom plate has two opposite first side edges and two opposite second side edges, wherein two ends of each of the first side edges are respectively connected to the two second side edges, and the two support side plates are respectively connected to the two first side edges; and wherein a first connection flange is arranged on the two second side edges, wherein a portion of the first connection flange in the groove is attached to the longitudinal beam bottom plate, and a portion of the first connection flange outside the groove is attached to the front wheel cover side reinforcement beam.

16. The vehicle according to claim 14, wherein a second connection flange is arranged on one of the support side plates, wherein the second connection flange and the support bottom plate are on opposite sides of the one of the support side plates, and the second connection flange is opposite to a side edge of the longitudinal beam side plate and is connected to the side edge of the longitudinal beam side plate.

* * * * *